US012707296B2

(12) United States Patent
Waje et al.

(10) Patent No.: US 12,707,296 B2
(45) Date of Patent: Aug. 11, 2026

(54) BACKHAUL OPTIMIZATION DURING EMERGENCY AND DISASTER RECOVERY

(71) Applicant: T-MOBILE INNOVATIONS LLC, Overland Park, KS (US)

(72) Inventors: Sanjay Baburao Waje, Plano, TX (US); Roopesh Kumar Polaganga, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 273 days.

(21) Appl. No.: 18/664,963

(22) Filed: May 15, 2024

(65) Prior Publication Data

US 2025/0358644 A1 Nov. 20, 2025

(51) Int. Cl.

*H04W 24/04* (2009.01)
*H04L 41/5009* (2022.01)
*H04W 24/08* (2009.01)

(52) U.S. Cl.

CPC ......... *H04W 24/04* (2013.01); *H04L 41/5009* (2013.01); *H04W 24/08* (2013.01)

(58) Field of Classification Search

CPC .... H04L 41/5009; H04W 24/04; H04W 24/08
See application file for complete search history.

(56) References Cited

U.S. PATENT DOCUMENTS 8,364,141 B1 * 1/2013 Kateley ................. H04W 24/02 370/242
9,225,609 B2 * 12/2015 McNaughton ...... H04L 41/5003
2016/0205570 A1 * 7/2016 Bedekar ................ H04W 24/02 370/252
2018/0041934 A1 * 2/2018 Agarwal ............... H04W 76/27
2024/0297834 A1 * 9/2024 Park .................... H04L 41/5087
2024/0340695 A1 * 10/2024 Paz ....................... H04W 28/06
2025/0097819 A1 * 3/2025 Ronkainen .......... H04W 40/246
2025/0119760 A1 * 4/2025 Khalid .................. H04W 24/02
2025/0168077 A1 * 5/2025 Muñoz De La Torre Alonso ....... H04L 41/5009

* cited by examiner

*Primary Examiner* — Amy R Hsu
(74) *Attorney, Agent, or Firm* — Shook, Hardy & Bacon L.L.P.

(57) ABSTRACT

Methods for optimizing wireless backhaul resources are provided. The wired backhaul connection from a RAN node to the core wireless communication network may be damaged or otherwise unavailable during an emergency or disaster relief scenario. In such scenarios, a wireless backhaul with limited bandwidth may be used to connect the RAN node to the core wireless communication network. In response to a wired backhaul failure in an emergency or disaster relief scenario, wireless backhaul resources are optimized to ensure crucial voice data is transferred from the base station to the core network by adjusting codec types to those with a lower bitrate, such that more users can be accommodated simultaneously.

20 Claims, 4 Drawing Sheets

BACKHAUL OPTIMIZATION DURING EMERGENCY AND DISASTER RECOVERY

SUMMARY

The present disclosure is directed to optimizing backhaul resources at a radio access network (RAN) node associated with a wireless communication network, substantially as shown and/or described in connection with at least one of the figures, and as set forth more completely in the claims.

According to various aspects of the technology, the backhaul portion of a wireless communication network provides a link between the core network, or backbone network, and the radio access network (RAN) node that facilitates wireless connections with user equipment (UE). The backhaul portion of the network is crucial for transporting communication data from a RAN node to the network operator's central data center. Whether because of congestion due to an emergency or a disaster, or because of physical damage to the link, the backhaul portion of the network may be damaged or otherwise unavailable. In such scenarios, a base station may use a wireless backhaul to communicate with the core network. The limited bandwidth available through wireless backhaul channels is most efficiently utilized by adjusting codor-decodor (codec) types, specifically by using a codec with an audio bandwidth that uses a lower bitrate for voice data.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein.

DETAILED DESCRIPTION

Figure 1:
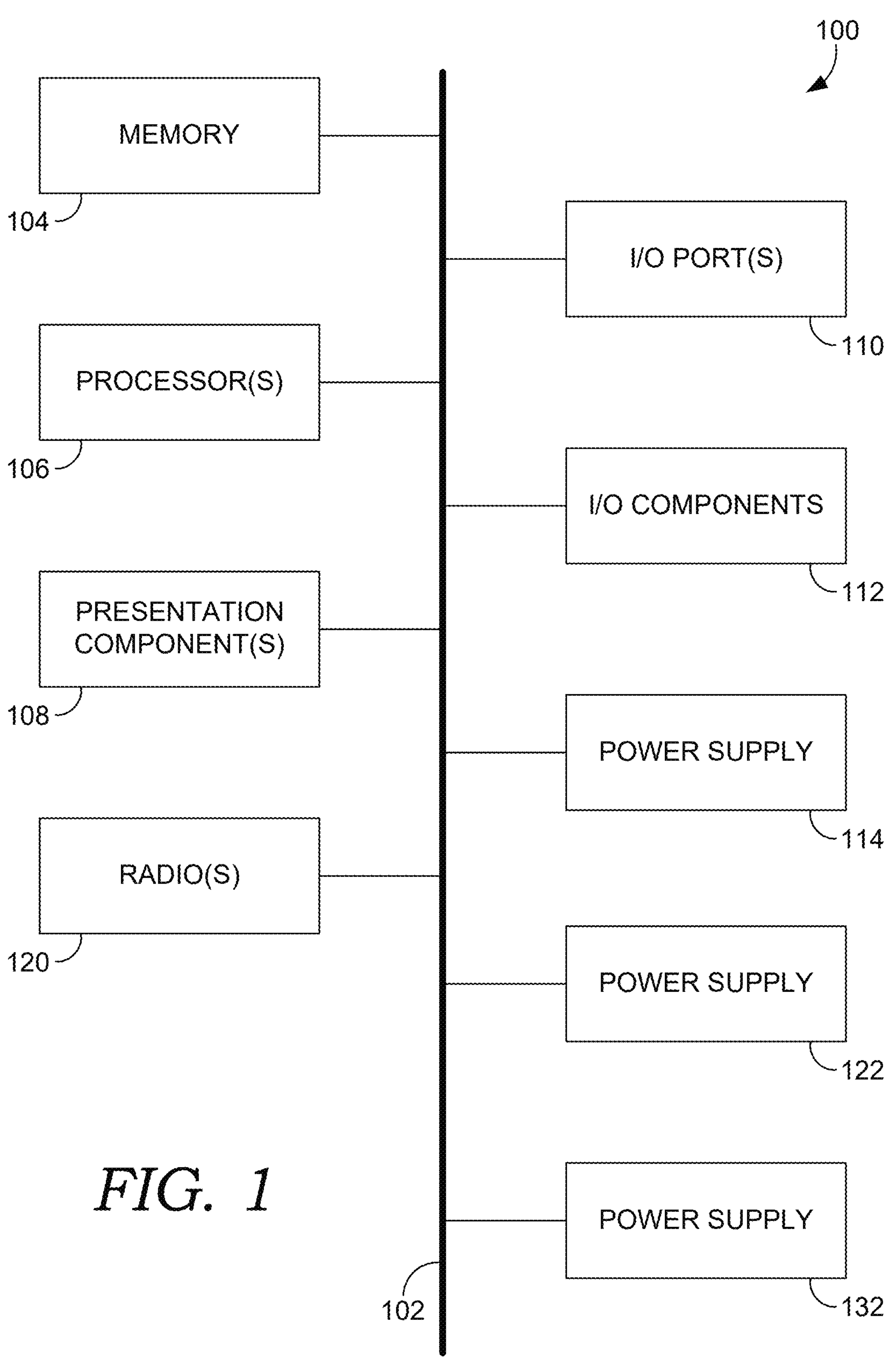
FIG. 1 illustrates a computing device suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "base station" refers to a centralized component or system of components that is configured to wirelessly communicate (receive and/or transmit signals) with a plurality of stations (i.e., wireless communication devices, also referred to herein as user equipment (UE(s)) in a particular geographic area. As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like. The term "node" and "radio access network (RAN) node" is used to refer to network access technology for the provision of wireless telecommunication services from a base station to one or more electronic devices, such as an eNodeB, gNodeB, etc. The term "cell" is used to describe one or more hardware and software components of a base station that are configured to provide wireless communication service to a geographic area.

Computer-readable media include both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, radio access network (RAN) nodes are typically connected to the core network, which provides connection to the internet, through backhaul connections. These connections are responsible for transmitting data traffic between the RAN nodes and the core network. RAN nodes typically obtain backhaul connection to the core network via wired network connection, such as an optical fiber or coaxial connection. This wired connection may include network infrastructure, including routers, switches, and intermediary links. In the event the wired backhaul connection between a RAN node and the core network fails, a wireless backhaul system may be available. Such a wireless backhaul system may, however, have limited bandwidth. Therefore, methods for effectively utilizing wireless backhaul resources in the event of a wired backhaul failure are necessary.

This may be especially true in emergency or disaster recover scenarios, in which there is an increased likelihood of a backhaul failure, and an increase in voice data transmission at the RAN node. For example, if a weather event or natural disaster results in damage or destruction of the backhaul infrastructure, the RAN node may lose its backhaul connection to the core network. In this same situation, users are more likely to make telephone calls to connect to, for example, emergency services. This increased likelihood to make telephone calls results in high volumes of voice data being routed through the RAN node. If a RAN node is relying on a wireless backhaul connection with limited bandwidth, some users may not be able to connect their voice calls due to the limited bandwidth of the wireless backhaul.

Conventionally, systems and methods capable of addressing wired backhaul connection failure include utilizing alternate wireless backhaul connections without adjusting codec types based on bitrates. User equipment connected to the RAN node utilizing an alternate wireless backhaul will continue transmitting voice data using the highest priority codec available to the UE, for example, Enhanced Voice Service (EVS). EVS uses a relatively large bandwidth or bitrate, therefore the limited resources of the wireless backhaul may be quickly exhausted. This is likely to result in the RAN node failing to serve other UEs requesting service.

Unlike conventional solutions, the present disclosure describes adjusting UE codec type to an audio bandwidth with a lower bitrate when the RAN node the UE is connected to is using a wireless backhaul. User's voice data sessions are monitored for key performance indicators (KPIs) such as audio signal quality values such as a mean opinion scores (MOS). If the voice data sessions have a KPI above a threshold value, the base station will instruct UEs to downgrade voice data sessions from a codec type with an audio bandwidth that uses a higher bitrate to one that uses a lower bitrate to accommodate a higher number of voice data sessions on the limited bandwidth of the wireless backhaul. This ensures optimal utilization of backhaul resources.

Accordingly, a first aspect of the present disclosure provides a system for optimizing backhaul capacity in a wireless telecommunication network. The system comprises one or more antennas configured to wirelessly communicate with a plurality of user equipment (UE), and one or more computer processing components configured to perform operations. The operations comprises first determining an anomalous condition exists on a first backhaul between a radio access network (RAN) node and a telecommunication service provider network. The operations further comprises, based on said determination, instructing each of the plurality of UEs to utilize a second backhaul to communicate at least a portion of the RAN node's traffic to the telecommunication service provider network. The operations further comprises determining a key performance indicator (KPI) for a plurality of UEs wirelessly connected to the RAN node is above a threshold value. The operations further comprises instructing each of the plurality of UEs to utilize a modified codec for transmitting voice data to the RAN node.

A second aspect of the present disclosure provides a method for optimizing backhaul resources in a wireless communications network, the method performed by a network management system. The method comprises network management system determining first detecting a wired backhaul failure at a RAN node. The method further comprises restoring connection between the RAN node and a core network using a wireless backhaul. The method further comprises determining an increase in voice data transmission at the RAN node. The method further comprises determining an audio signal quality value for a plurality of UEs transmitting voice data to the RAN node is above a threshold value. The method further comprises communicating, to the plurality of UEs transmitting voice data to the RAN node, a modified codec for transmitting voice data.

Another aspect of the present disclosure is directed to a non-transitory computer readable media having instructions stored thereon that, when executed by one or more computer processing components, cause the one or more computer processing components to perform a method for optimizing backhaul capacity. The method comprises determining a limited backhaul capacity between a RAN node and a telecommunications service provider. The method further comprises determining an audio signal quality value for a plurality of UEs is above a threshold value. The method further comprises instructing UEs connected to the RAN node to use a codec audio bandwidth with a low bitrate for voice data transmissions.

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media of the computing device 100 may be in the form of a dedicated solid state memory or flash memory, such as a subscriber information module (SIM). Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, non-removable, or a combination thereof. Exemplary memory includes solid-state memory, hard drives, optical-disc drives, etc. Computing device 100 includes one or more processors 106 that read data from various entities such as bus 102, memory 104 or I/O components 112, and power supply 114. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

The radio 120 represents one or more radios that facilitate communication with one or more wireless networks using one or more wireless links. While a single radio 120 is shown in FIG. 1, it is expressly contemplated that there may be more than one radio 120 coupled to the bus 102. In aspects, the radio 120 utilizes a transmitted to communicate with a wireless telecommunications network. It is expressly contemplated that a computing device 100 with more than one radio 120 could facilitate communication with the wireless network via both the first transmitter and additional transmitters (e.g., a second transmitter). Illustrative wireless telecommunications technologies include CDMA, GPRS, TDMA, GSM, and the like. The radio 120 may carry wireless communication functions or operations using any number of desirable wireless communication protocols, including 802.11 (Wi-Fi), WiMAX, LTE, 3G, 4G, LTE, 5G, NR, VoLTE, or other VoIP communications. As can be appreciated, in various embodiments, radio 120 can be configured to support multiple technologies and/or multiple radios can be utilized to support multiple technologies. A wireless telecommunications network might include an array of devices, which are not shown as to obscure more relevant aspects of the invention. Components such as a base station or communications tower (as well as other components) can provide wireless connectivity in some embodiments.

Figure 2:
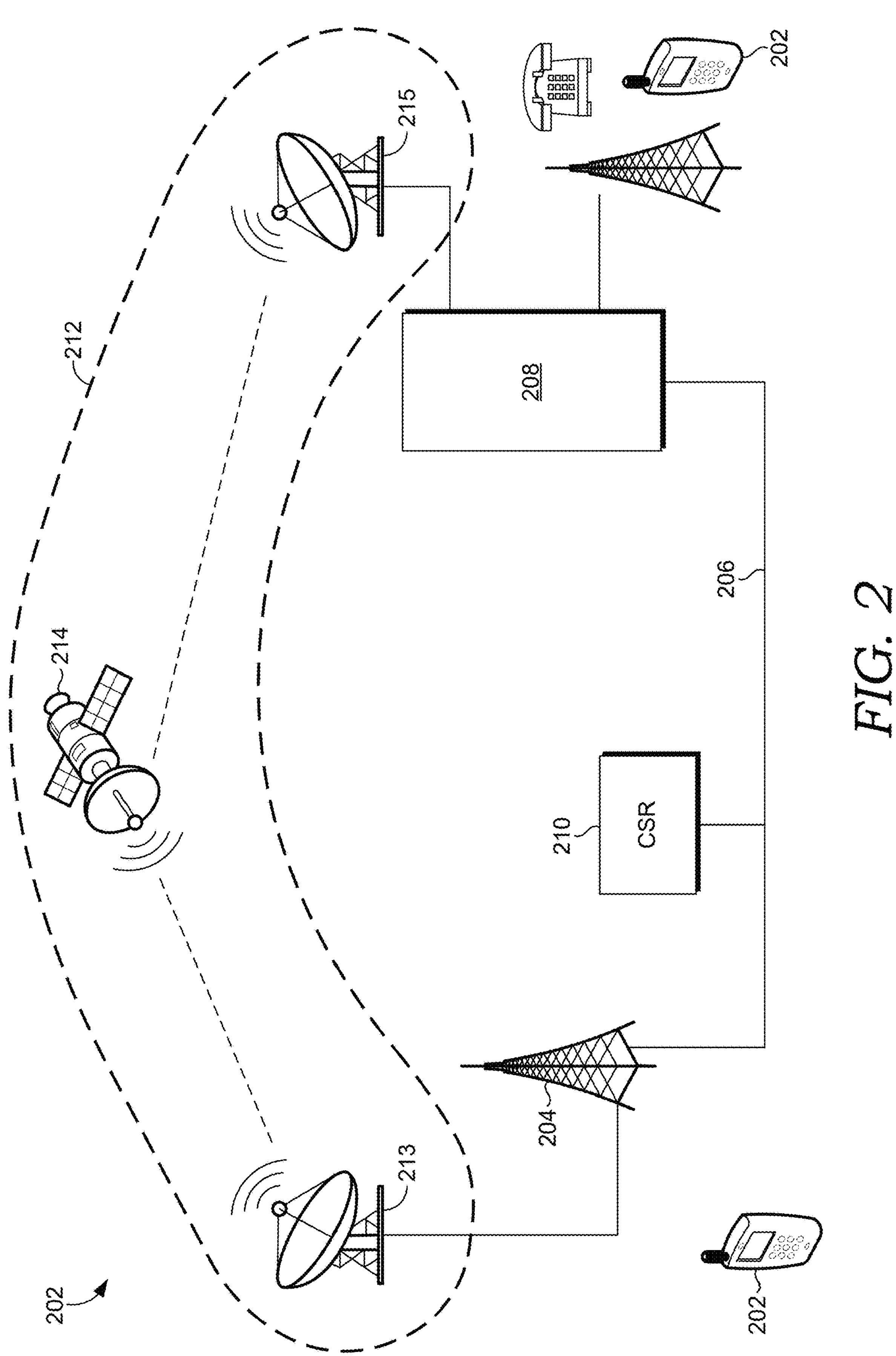
FIG. 2 depicts an example network environment in which implementations of the present disclosure may be employed.

Turning now to FIG. 2, a network environment is illustrated in which implementations of the present disclosure may be employed. Such a network environment is illustrated and designated generally as network environment 200. At a high level the network environment 200 comprises one or more UE 202, one or more RAN nodes 204, and one or more core networks 206. Though the UE 202 is illustrated as a cellular phone, UE 202 may take on a variety of forms, such as a personal computer (PC), a user device, a smart phone, a smart watch, an extended reality (XR) device, Internet of Things (IoT) device, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device that comprising any one or more feature of computing device 100 of FIG. 1

Similarly, though the one or more RAN nodes 204 are illustrated as macro cells on a cell tower, any scale or form of access point acting as a transceiver station for wirelessly communicating with a UE 202, including small cells, pico cells, and the like, are suitable for use with the present disclosure. The network environment 200 is but one example of a suitable network environment and is not intended to suggest any limitation as to the scope of use or functionality of the disclosure. Neither should the network environment 200 be interpreted as having any dependency or requirement to any one or combination of components illustrated.

Each of the one or more RAN nodes 204 is connected to the core network 208 through a backhaul connection 206. The backhaul portion of a wireless communication network provides a link between the core network 208 and the RAN node 204 that facilitates wireless connections with UEs 202. The backhaul connection 206 is crucial for transmitting data collected at the RAN node 204 to the core network 208 where it can be processed, routed, and delivered. The backhaul connection 206 may be a physical cable connection linking the RAN node 204 to the core network 208. The physical cable connection may be fiber optic cables. The physical cable may be buried underground and routed from the RAN node 204 to the nearest point of presence (PoP) in the wireless telecommunications network. This type of physical backhaul connection may be referred to as a wired backhaul.

The RAN node 204 monitors the backhaul connection via the cell site router (CSR) 210. The CSR 210 continuously checks the status of the backhaul connection 206, including bandwidth usage, latency, packet loss, and other metrics. This data helps detect network anomalies or degradation, which can indicate issues with the backhaul connection 206 that need to be addressed to avoid service disruptions.

In the event of a backhaul outage, the RAN node 204 may lose connection with the core network 208. To restore connection to the core network 208, the RAN node 204 may be programmed to connect to the core network 208 via a wireless backhaul 212. The wireless backhaul 212 may utilize, for example, microwave radio links, a millimeter wave system, free space optics, LTE and 5G networks, or satellites to transmit data from the RAN node 204 to the core network 208.

Wired backhaul connections are generally preferred over wireless backhaul connections. Wired backhaul systems provide high-capacity connections that are generally more secure and stable than wireless backhaul options. For instance, wired backhaul connections may accommodate more users at higher bandwidths than wireless backhaul connections. Wireless backhaul systems generally have more stringent bandwidth restrictions than wired backhaul systems.

While wired backhaul connections are generally more stable than wireless connections, there may be instances in which the wired backhaul becomes limited, unstable, or unavailable. For example, a wired backhaul may experience physical disturbance. The backhaul cables and components may be damaged by construction activities or natural disasters such as earthquakes and hurricanes. Another example of physical disturbance may be environmental exposure such as extreme temperatures, moisture, or chemicals that may cause the degradation of various components of the wired backhaul. Yet another example of physical disturbance may be vandalism or theft of vital components of the backhaul.

In accordance with certain aspects herein, in the event of congestion at the backhaul, with or without a physical disturbance of the backhaul connection 206, the RAN node 204 may augment the backhaul connection 206 with a wireless backhaul 212 connection. For example, if the CSR 210 detects congestion at the backhaul with or without a physical disturbance of the backhaul connection, the RAN node 204 may route a portion of the RAN node 204 traffic to the wireless backhaul 212 and continue to route a portion of the RAN node 204 traffic through the backhaul connection 206.

If there is an issue with the backhaul connection 206 that causes a disruption in communication between the RAN node 204 and the core network 208, the CSR 210 may detect an anomaly. This disruption may be a limited or an unstable connection between the RAN node 204 and the core network 208. It may also be a complete failure of the backhaul connection 206 between the RAN node 204 and the core network 208. If the CSR 210 detects an anomaly, the RAN node 204 may fall back and connect to the core network via a wireless backhaul 212. As discussed above, the wireless backhaul 212 may utilize, for example, microwave radio links, a millimeter wave system, free space optics, LTE and 5G networks, or satellites to transmit data from the RAN node 204 to the core network 208. The wireless backhaul 212 depicted in FIG. 2 is a satellite backhaul, but it should be understood the use of various types of wireless backhaul systems are contemplated herein. The wireless backhaul 212 of FIG. 2 may take a form that comprises a wireless backhaul transmitter 213, a wireless RAN node 214, and a core network interface 215. If the wireless backhaul 212 utilized by the RAN node 204 is a satellite backhaul system, the wireless RAN node 214 may comprise a satellite and the core network interface 215 may comprise a satellite ground station.

Based on a determination that at least a portion of UE 202 traffic will use a wireless backhaul 212, the RAN node 204 may implement a backhaul conservation protocol. The backhaul conservation protocol includes instructing UE 202 to use a codec with an audio bandwidth that uses a lower bitrate. To ensure users maintain a certain level of voice clarity and quality, UEs 202 may be instructed to use a codec with an audio bandwidth that uses a lower bitrate if a key performance indicator (KPI) is above a threshold value. If the KPI falls below a threshold value while using an instructed codec with an audio bandwidth that uses a lower bitrate, UEs 202 may be further instructed to use a codec with an audio bandwidth that uses a higher bitrate.

Audio codecs are used to compress and decompress or code and decode digital audio data, which may reduce bandwidth usage and storage requirements. By adjusting the compression level and robustness of the transmission, codecs may aid in balancing quality and efficiency of the network. As wireless network technology evolves, so do the codec capacities. Each generation of wireless technology may bring enhanced codec capabilities, improving not just the efficiency of data transmission within the network, but also the quality of voice calls. Different codec types use different audio bandwidths and different bitrates. Examples of codec types include Enhanced Voice Service (EVS) codec, which uses a super wide band audio bandwidth and 5.9 to 128 Kbps, Extended AMR-WB (AMR-WB+) codec, which uses a full band audio bandwidth and 6 to 48 Kbps, AMR Wideband (AMR-WB) codec, which uses a wide audio bandwidth and 6.6 to 23.85 Kbps, AMR Narrowband (AMR-NB) codec, which uses a narrow band audio bandwidth and 4.72 to 12.2K bps and Enhanced Full-Rate (EFR) codec, which uses a narrow band audio bandwidth and 12.2 Kbps. As discussed above, codec technology is continuously evolving. The above codec types are included as examples and are not meant to be a comprehensive list of codec types that may be used according to aspects herein. It is contemplated any codec type available to UEs 202 may be used according to aspects herein.

For example, based on a determination that at least a portion of UE traffic will use a wireless backhaul 212, the RAN node 204 may implement a backhaul conservation protocol. The backhaul conservation protocol may include instructing a UE 202 using Enhanced Voice Service (EVS) codec, which uses a super wide band audio bandwidth and 5.9 to 128 Kbps may be instructed to switch to Extended AMR-WB (AMR-WB+), which uses a full band audio bandwidth and 6 to 48 Kbps or to AMR Wideband (AMR-WB), which uses a wide audio bandwidth and 6.6 to 23.85 Kbps. In accordance with aspects herein, both UEs 202 with ongoing voice data connections to the RAN node 204 and UEs 202 establishing new voice data connections with the RAN node 204 may be instructed to adjust codec type.

As contemplated herein, if a KPI for a plurality of UEs 202 is above a threshold value, the plurality of UEs 202 may be instructed to use a codec audio bandwidth with a lower bitrate for voice data transmissions. In other aspects, when a KPI for an individual UE 202 is above a threshold value, the individual UE 202 may be instructed to use a codec audio bandwidth with a lower bitrate for voice transmission. In other aspects, when a KPI for a plurality of UEs is above a threshold value, UEs 202 with a second KPI above a threshold value may be instructed to use a codec audio bandwidth with a lower bitrate for voice data transmission, while UEs 202 with a second KPI below a threshold value may be instructed to use a codec audio bandwidth with a higher bitrate.

In accordance with aspects herein, if a KPI for a plurality of UEs 202 is below a threshold value, the plurality of UEs 202 may be instructed to use a codec audio bandwidth with a higher bitrate for voice data transmissions. In other aspects, when a KPI for an individual UE 202 is below a threshold value, the individual UE 202 may be instructed to use a codec audio bandwidth with a higher bitrate for voice transmission. In other aspects, when a KPI for a plurality of UEs is below a threshold value, UEs 202 with a second KPI below a threshold value may be instructed to use a codec audio bandwidth with a higher bitrate for voice data transmission, while UEs with a second KPI above a threshold value may be instructed to use a codec audio bandwidth with a lower bitrate.

A KPI is any metric or parameter, whether observed or calculated, that can be used to characterize a wireless connection between a UE 202 and a RAN node 204. Examples of a KPI that may be used by a mobile network operator may be a reference signal power (e.g., RSRP), a signal quality (e.g., RSRQ), an audio quality (MOS), noise parameter (e.g., SINR), channel indicator (e.g., CQI), or user-perceptible quality of experience. According to aspects herein, a KPI for a plurality of UEs 202 connected to the RAN node 204 may be each be above a threshold value, or a KPI for a plurality of UEs 202 connected to the RAN node 204 may be above an average threshold value, wherein the average threshold value is an average for a plurality of UEs 202.

An example KPI that may be evaluated for voice data is an audio signal quality value comprising a mean opinion score (MOS). MOS is a measure used to evaluate the quality of voice communication in a telecommunications network. MOS provides a numerical indication of the quality of voice samples. MOS is a standard way to measure and report overall listening quality of a voice call or data transmission. MOS is rated on a scale from 1 to 5, where 1 represents the worst voice quality and 5 represents excellent voice quality. MOS may be determined by algorithms and software tools designed to predict MOS scores based on technical parameters of voice data. In accordance with aspects described herein, the KPI for a plurality of UEs 202 transmitting voice data to the RAN node 204 may comprise a MOS. In one embodiment, the MOS for a plurality of UEs 202 connected to the RAN node 204 may be each be above a threshold value. In another embodiment, the MOS for a plurality of UEs 202 connected to the RAN node 204 may be above an average threshold value, wherein the average threshold value is the average MOS for a plurality of UEs 202.

Figure 3:
FIG. 3 depicts a flow diagram of a method for optimizing backhaul resources in a wireless communication network in accordance with aspects herein.
Figure 3:
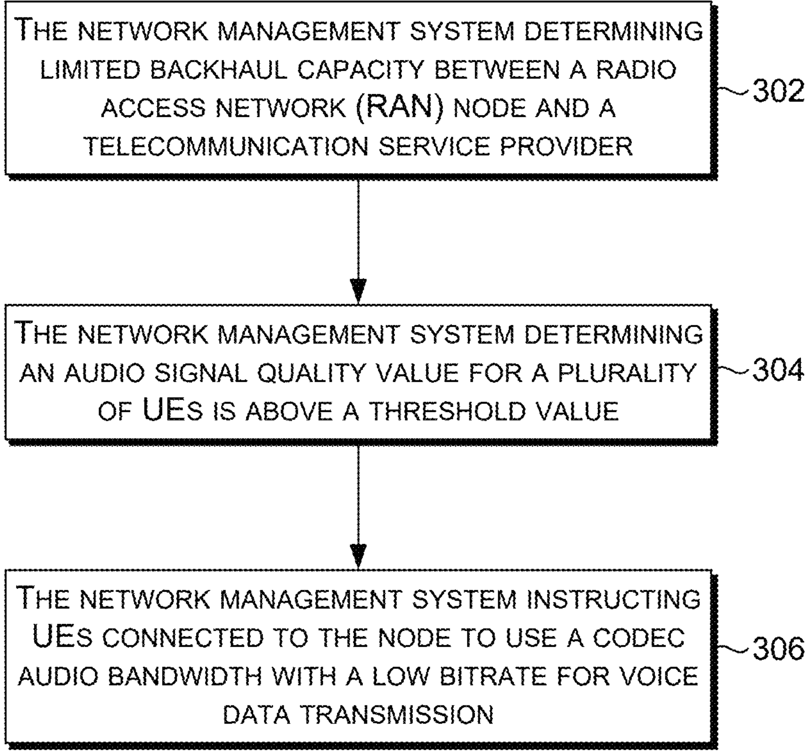

FIG. 3 depicts a flow diagram of a method for optimizing backhaul resources in a wireless communication network in accordance with aspects herein. The method 300 begins at step 302 with the network management system determining limited backhaul capacity between a radio access network (RAN) node and a telecommunication service provider. The method continues at step 304, with the network management system determining an audio signal quality value for a plurality of UEs is above a threshold value. The method continues at step 306, with the network management system instructing UEs connected to the node to use a codec with an audio bandwidth that uses a lower bitrate for voice data transmission.

Figure 4:
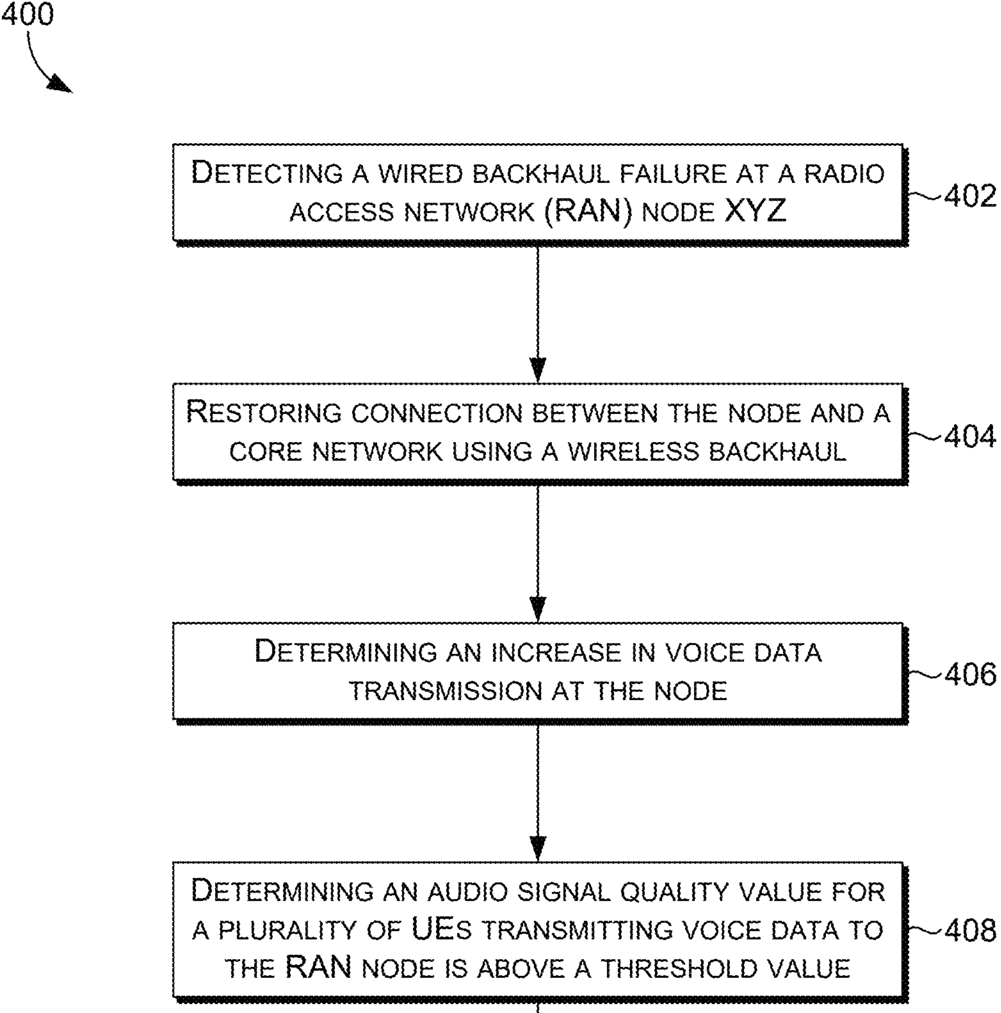
FIG. 4 depicts a flow diagram of a second method for optimizing backhaul resources in a wireless communication network in accordance with aspects herein.

FIG. 4 depicts a flow diagram of a second method for optimizing backhaul resources in a wireless communication network in accordance with aspects herein. The method 400 begins at step 402, detecting a wired backhaul failure at a radio access network (RAN) node, such as the RAN node 204 of FIG. 2. The method continues with step 404, restoring connection between the node and a core network by using a wireless backhaul. The method continues with step 406, determining an increase in voice data transmission at the node. The method continues with step 408, determining an audio signal quality value for a plurality of UEs transmitting voice data to the RAN node is above a threshold value. The method continues with step 410, communicating, to the plurality of UEs transmitting voice data to the RAN node, a modified codec for transmitting voice data.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for optimizing backhaul capacity in a in a wireless telecommunication network, the system comprising:

one or more antennas configured to wirelessly communicate with a plurality of user equipment (UE); and one or more computer processing components configured to perform operations comprising:

determining an anomalous condition exists on a first backhaul between a radio access network (RAN) node and a telecommunication service provider network;

based on said determination, instructing each of the plurality of UEs to utilize a second backhaul to communicate at least a portion of the RAN node's traffic to the telecommunication service provider network;

determining a key performance indicator (KPI) for a plurality of UEs wirelessly connected to the RAN node is above a threshold value; and instructing each of the plurality of UEs to utilize a modified codec for transmitting voice data to the RAN node.

2. The system of claim 1, wherein the second backhaul has more stringent bandwidth restrictions than the first backhaul.

3. The system of claim 1, wherein the KPI is an audio signal quality value comprising a mean opinion score (MOS).

4. The system of claim 3, wherein the audio signal quality value is determined for each connection between the plurality of UEs connected the RAN node, and the audio signal quality value comprises a MOS of 3.

5. The system of claim 3, wherein the audio signal quality value is an average audio signal quality value of the plurality of UEs connected to the RAN node, and the audio signal quality value is a MOS of 3.

6. The system of claim 1, wherein the backhaul anomaly indicates the first backhaul has failed.

7. The system of claim 1, further comprising instructing the plurality of UEs to utilize the modified codec for transmitting voice data for new voice data sessions.

8. The system of claim 7, wherein the instruction causes the plurality of UEs to select an audio bandwidth with a lower bitrate.

9. The system of claim 1, wherein the first backhaul anomaly at a node is detected by a Cell Site Router (CSR).

10. A method for optimizing backhaul resources in a wireless communication network, the method comprising:

detecting a wired backhaul failure at a radio access network (RAN) node;

restoring connection between the RAN node and a core network using a wireless backhaul;

determining an increase in voice data transmission at the RAN node;

determining an audio signal quality value for a plurality of UEs transmitting voice data to the RAN node is above a threshold value; and communicating, to the plurality of UEs transmitting voice data to the RAN node, a modified codec for transmitting voice data.

11. The method of claim 10, wherein the RAN node utilizes a cell site router (CSR) to detect the wired backhaul failure at a node.

12. The method of claim 10, wherein the modified codec for transmitting voice data to the RAN node is a codec with a lower bitrate to the plurality of UEs transmitting voice data to the RAN node.

13. The method of claim 10, further comprising instructing UEs to utilize the modified codec for new voice data sessions.

14. A non-transitory computer readable media having instructions stored thereon that, when executed by one or more computer processing components, cause the one or more computer processing components to perform a method for optimizing backhaul capacity, the method comprising:

determining limited backhaul capacity between a radio access network (RAN) node and a telecommunication service provider;

determining an audio signal quality value for a plurality of UEs is above a threshold value; and instructing UEs connected to the RAN node to use a codec audio bandwidth with a low bitrate for voice data transmission.

15. The method of claim 14, wherein the method further comprises communicating at least a portion of data traffic to the telecommunication service provider using a wireless backhaul.

16. The method of claim 14, further comprising instructing UEs to use a codec audio bandwidth with a low bitrate for new voice data sessions.

17. The method of claim 14, wherein the codec audio bandwidth instructed is AMR-NB codec.

18. The method of claim 14, wherein the audio signal quality value is a mean opinion score (MOS).

19. The method of claim 18, wherein the MOS is at or above a 3.

20. The method of claim 14, further comprising when the audio signal quality value for the plurality of UEs is below the threshold value, instructing UEs connected to the RAN node to use a codec audio bandwidth with a higher bitrate for voice data transmissions.

* * * * *